United States Patent [19]
Haglund

[11] 3,731,954
[45] May 8, 1973

[54] FLUID COUPLING

[76] Inventor: Robert J. Haglund, 5990 Orchard Bend, Birmingham, Mich.

[22] Filed: Sept. 23, 1971

[21] Appl. No.: 182,952

[52] U.S. Cl. .....................285/12, 285/287, 285/336, 285/363, 285/DIG. 16
[51] Int. Cl.........F16l 23/00, F16l 13/08, F16l 13/10
[58] Field of Search.......................285/12, 336, 363, 285/287, DIG. 16

[56] References Cited

UNITED STATES PATENTS

| 3,142,499 | 7/1964 | Lang | 285/336 X |
| 502,665 | 8/1893 | Friede | 285/12 X |
| 3,139,480 | 6/1964 | Desloge | 285/12 X |
| 2,159,811 | 5/1939 | Leonardo | 285/12 |
| 1,363,320 | 12/1920 | Horiuchi | 285/336 |
| 2,194,266 | 3/1940 | Allen | 285/336 |
| 2,699,344 | 1/1955 | Bissell | 285/336 |
| 3,284,106 | 11/1966 | McIntosh et al. | 285/336 |

FOREIGN PATENTS OR APPLICATIONS

| 1,191,066 | 4/1959 | France | 285/12 |
| 1,044,599 | 10/1966 | Great Britain | 285/336 |

*Primary Examiner*—Thomas F. Callaghan
*Attorney*—Ronald L. Phillips

[57] ABSTRACT

A fluid coupling comprising a pair of connected coupling members having registering passages extending therethrough with the passage in one of the coupling members having a threaded portion for connection to a threaded pipe and also having a smooth bore portion for bonding in the alternative to a non-threaded pipe of the same size as the threaded pipe. There is also provided an annular seal that seals the juncture of the coupling members and also provides a seal in addition to the bonded joint.

1 Claim, 3 Drawing Figures

PATENTED MAY 8 1973 3,731,954

ROBERT J. HAGLUND
INVENTOR.

BY
Ronald L. Phillips
ATTORNEY

FLUID COUPLING

This invention relates to fluid couplings and more particular to a fluid coupling for connection to either a threaded or non-threaded pipe.

It is well known that plumbing installations may have either threaded pipe with threaded couplings or non-threaded pipe with non-threaded couplings that are bonded, the choice of pipe being dependent on such factors as building codes, relative cost and availability. These different type couplings are not interchangeable and thus it is required that both types of couplings be as available as the type of pipes with which they are used. This has been found to cause considerable problems in installation of plumbing fixtures since it is common practice to have fixtures adapted for only threaded pipe connection while most present day pipe installations employ non-threaded pipe. Furthermore, this requirement is undesirable in repair work where it is common for a plumber whose traveling inventory is of necessity limited to not know the type of pipe until he arrives at the job site.

The fluid coupling according to the present invention is usable with either a threaded or non-threaded pipe. The coupling comprises a pair of connected coupling members having registering passages with the passage in one member having provisions for receiving in the outer end either a threaded or non-threaded pipe. For connection with the threaded pipe, the passage in the one coupling member has a pipe thread portion extending inward from the outer passage end. For connection with the non-threaded pipe, this passage has a smooth bore portion extending inward from the pipe thread portion. A non-threaded pipe of the same size as the threaded pipe has a smaller external diameter and the smooth bore portion is made slightly larger than this dimension to receive the non-threaded pipe to provide for a bonded connection therewith. In addition, there is provided an annular seal which seals the coupling members at their juncture and is also arranged to engage an extension of the non-threaded pipe to provide a seal between this pipe and the coupling member in addition to that provided by the bonded joint.

An object of the present invention is to provide a new and improved fluid coupling.

Another object is to provide a fluid coupling having a threaded portion for engaging a threaded pipe and a smooth bore portion for providing a bondable joint with a non-threaded pipe of the same size as the threaded pipe.

Another object is to provide a fluid coupling having a pair of joined coupling members with one member having a threaded portion for connection to a threaded pipe and a smooth bore portion for providing a bonded connection with a non-threaded pipe of the same size as the threaded pipe and a seal arrangement for sealing the coupling members and also for providing a seal between one coupling member and the non-threaded pipe.

These and other objects of the present invention will be more apparent from the following description and drawing in which.

Figure 1:
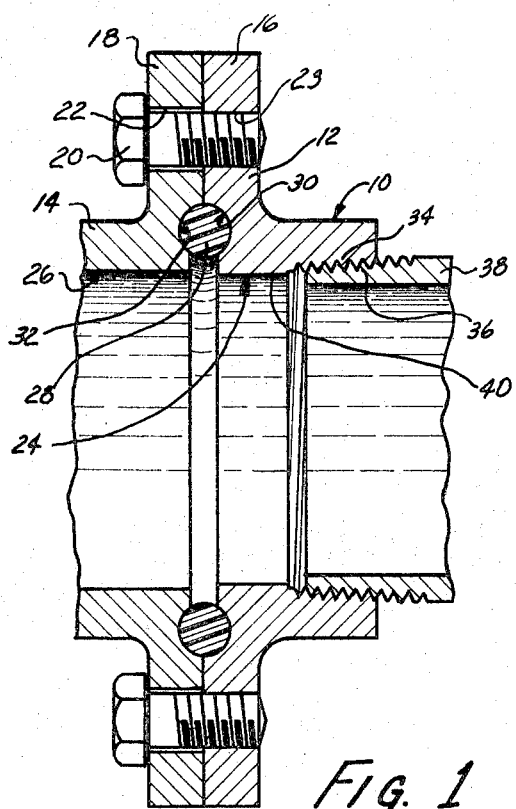
FIG. 1 is a longitudinal sectional view of a fluid coupling constructed according to the present invention connected to a threaded pipe.

Referring to FIG. 1 there is shown a fluid coupling 10 constructed according to the present invention. The coupling 10 comprises a pair of complementary coupling halves or members 12 and 14 which are joined or clamped at annular flanged portions 16 and 18 by suitable means such as bolts 20 which extend through circumferentially spaced apertures 22 in flange 18 and are threaded in corresponding threaded holes 23 in the other flange portion 16. The coupling members 12 and 14 have registering central passages 24 and 26 which provide a fluid passage through the coupling. The fluid passage through the coupling is sealed at the juncture of the coupling members by a seal 28 which may be an O-ring seal or packing ring. Seal 28 is received on opposite sides in annular grooves 30 and 32 in the opposing faces of the flange portions 16 and 18. The grooves 30 and 32 are spaced radially outward of the passages 24 and 26 and the seal 28 is clamped in these grooves to effect tight sealing.

According to the present invention, the coupling member 12 has at the outer end of passage 24 a pipe thread portion 34 which extends inward to a point midway along the passage length. The threaded portion 34 is for engaging threads 36 of a threaded pipe 38 as shown in FIG. 1, the threaded portion 34 being of sufficient length to permit suitable tightening of the pipe joint. The passage 24 in coupling member 12 further includes a smooth bore portion 40 that is coaxial with pipe thread portion 34 and extends from the termination of the pipe thread portion to the other or inner end of coupling member 12. The smooth bore portion 40 is for receiving a non-threaded pipe 42 as shown in FIG. 2 as an alternative to receiving the threaded pipe 38.

Pipe sizes are determined by the internal diameter and for the same size threaded and non-threaded pipe whose internal diameters are thus equal, the external diameter of the threaded pipe is larger than the non-threaded pipe 32 to provide for threading while maintaining suitable pipe strength. The fluid coupling according to the present invention is for use with the same size threaded and non-threaded pipe and for that purpose the smooth bore portion 40 is provided with a diameter slightly larger than the external diameter of the non-threaded pipe 42 but less than the minimum diameter of the pipe threaded portion 34. The smooth bore portion 40 is thus able to receive closely the non-threaded pipe 42 where pipe 42 extends past the threaded portion 34. The clearance between the smooth bore portion 40 and the projection of the non-threaded pipe 32 is of sufficient size to provide for bonding these parts to effect a permanent sealed joint. In the case of a metal pipe and coupling member, this bond is effected by metal solder whereas with plastic pipe and coupling member the bonding is by a suitable cement or adhesive or these parts may be fused. In the case of dissimilar materials the bonding is by a suitable cement or adhesive.

Thus the coupling member 12 is adapted for connection to a threaded pipe end and in the alternative to a non-threaded pipe of the same size and without reversing the coupling member 12 since the different types of pipe are received in the same end. Accordingly, on encountering either a threaded or non-threaded pipe in a rough plumbing installation, such as where the end of the pipe extends from a wall opening, the coupling member 12 is first connected to the pipe by either threading or bonding respectively. Then the seal 28 is positioned on the exposed side of coupling member 12 whereafter the other coupling member 14 is put in position and the assembly secured from the exposed side by bolts 20. The coupling member 14 may be part of a plumbing fixture and it is also contemplated that it could be like the coupling member 12 and thus adapted for connection to either a threaded or non-threaded pipe.

Figure 2:
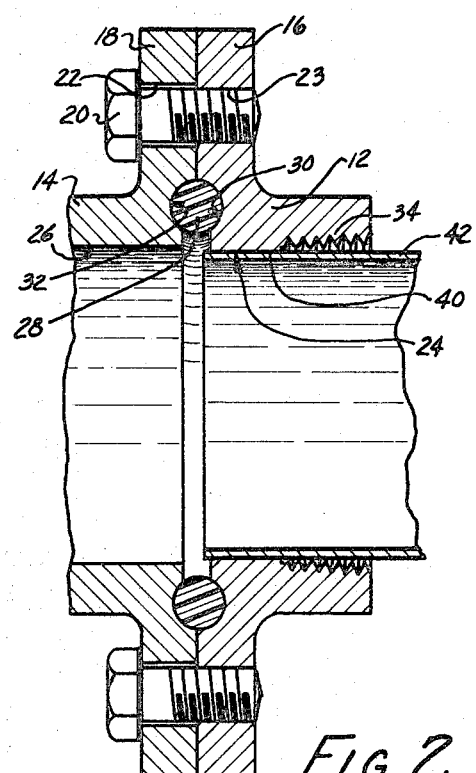
FIG. 2 is a view similar to FIG. 1 with the fluid coupling connected to a non-threaded pipe instead of a threaded pipe.
Figure 3:
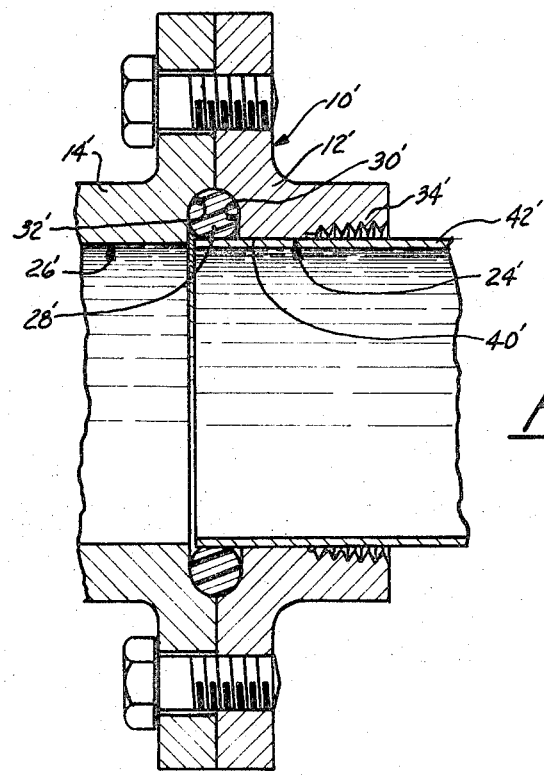
FIG. 3 is a longitudinal sectional view of another embodiment of the fluid coupling according to the present invention connected to a non-threaded pipe.

The fluid coupling embodiment shown in FIG. 3 is similar to the FIG. 1 and 2 embodiment but has additional sealing for when the coupling is used with non-threaded pipe. The FIG. 3 coupling embodiment has like numerals but primed for identifying the corresponding portions shown in FIGS. 1 and 2. In the FIG. 3 fluid coupling embodiment 10', the seal grooves 30' and 32' have their maximum axial dimension or depth extending fully to the internal diameter of the respective passages 24' and 26' and have a smaller maximum diameter for receiving a smaller diameter seal 28'. The inner diameter of seal 28' is sized so as to grip a portion of the non-threaded pipe 42' which in this installation is inserted past both the pipe thread portion 34' and the smooth bore portion 40' for such engagement. With this arrangement the seal 28' provides a seal at the juncture of the coupling members 12' and 14' like in the FIG. 1 coupling embodiment and in addition provides a seal between the coupling member 12' and the non-threaded pipe 40'. Thus the FIG. 3 coupling is in all respects like the FIG. 1 coupling in the case of a threaded pipe connection but in the case of a non-threaded pipe connection provides sealing in addition to the bond between coupling member 12' and pipe 40'. The assembly of the FIG. 3 coupling embodiment is like that of the FIG. 1 coupling embodiment but when the seal 28' is inserted it is stretched over the projecting end of the non-threaded pipe 40' before engaging groove 30'.

The above described embodiments are illustrative of the invention which may be modified within the scope of the appended claims.

I claim:

1. A fluid coupling comprising a pair of coupling members having opposing faces at one end, means for connecting said coupling members with said faces engaged, said coupling members having registering passages extending therethrough adapted to receive an externally threaded pipe or a non-threaded pipe having the same internal diameter as the threaded pipe and a smaller and constant external diameter, only one of said coupling members adapted for connection to said externally threaded pipe when received in the other end of said one coupling member and, alternatively, to said non-threaded pipe when received in said other end of said one coupling member, the passage in said one coupling member including a pipe thread portion extending from said other end of said one coupling member to an intermediate point along the passage length for engaging one end of said threaded pipe to effect connection of said threaded pipe and said one coupling member, the passage in said one coupling member further including a smooth bore portion of substantial length co-axial with said pipe thread portion and extending from said pipe thread portion to said one end of said one coupling member, said smooth bore portion having a diameter slightly larger than said external diameter of said non-threaded pipe, said non-threaded pipe having a first external portion locatable past said pipe thread portion in said smooth bore portion to provide for sealingly bonding said non-threaded pipe and said one coupling member, said non-threaded pipe also having a second external portion locatable past said smooth bore portion in alignment with said engaged faces of said coupling members and extending into said other coupling member, and seal means comprising a pair of opposed annular grooves in said engaged faces of said coupling members, said grooves having axial depths extending fully to the respective coupling members' passages, a single annular seal mounted in said grooves clamped in an axial direction by said coupling members for sealing the juncture of said coupling members while also normally sealingly gripping at an inner diameter said second external portion of said non-threaded pipe to provide a seal between said second external portion of said non-threaded pipe and said one coupling member in addition to their bonding.

* * * * *